May 3, 1927.
D. J. McGEEHIN
1,627,045
PIPE SCRAPER
Filed Feb. 19, 1926
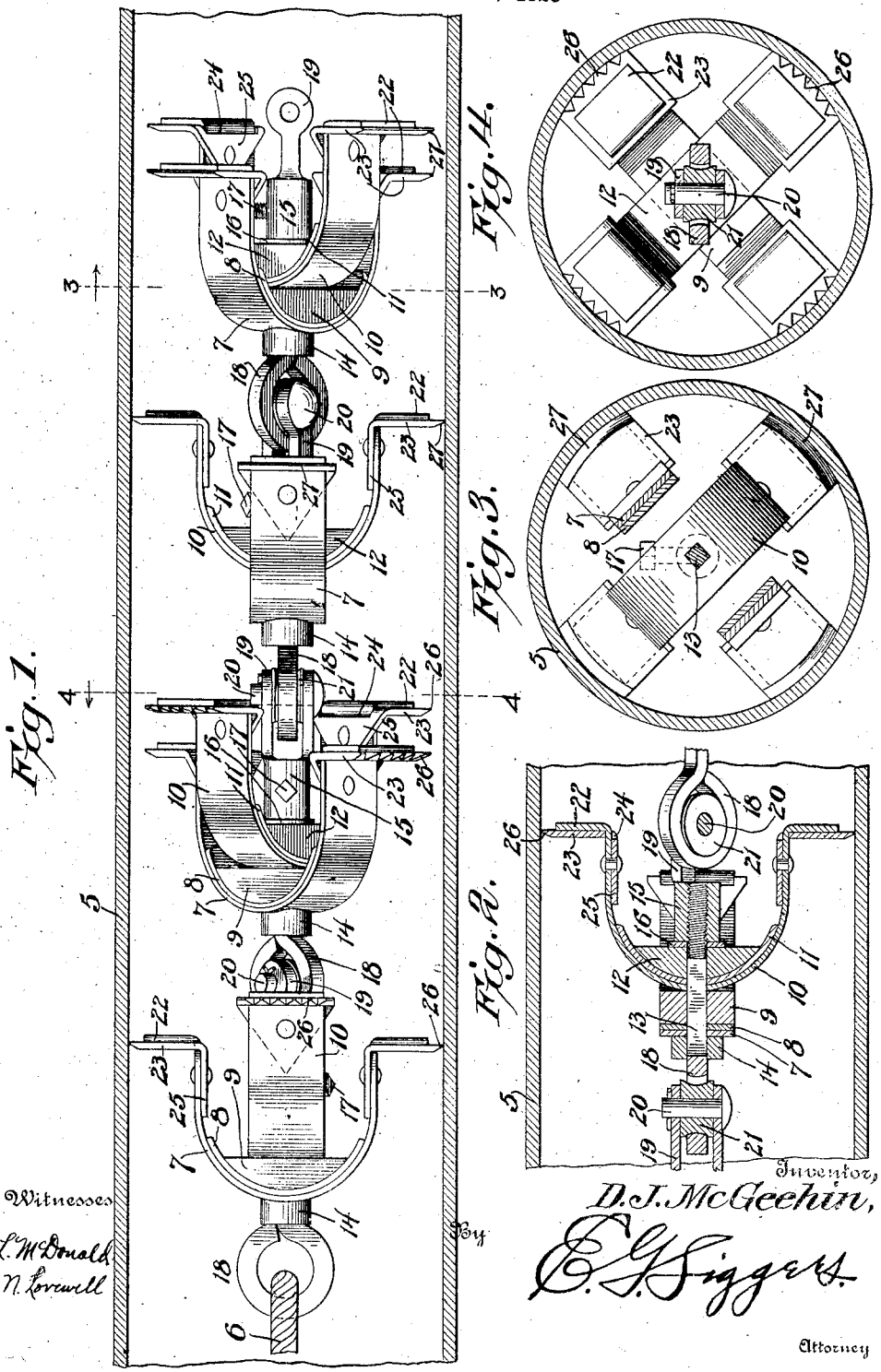
Inventor,
D. J. McGeehin, Patented May 3, 1927.

1,627,045

UNITED STATES PATENT OFFICE.

DANIEL J. McGEEHIN, OF WEST HAZLETON, PENNSYLVANIA.

PIPE SCRAPER.

Application filed February 19, 1926. Serial No. 89,434.

This invention relates to a pipe scraper adapted to be drawn through a water main, or similar pipe, to remove deposits which adhere to the inside thereof, so that the entire capacity of the pipe may be made available for the flow of water therethrough.

The general object of the invention is to provide for this purpose a string of scraper elements, connected to each other by joints of improved construction, which permit the utmost flexibility in passing around bends in the pipe, while the scraper elements bear with considerable pressure against the wall of the pipe and collectively scrape its entire surface, yet are sufficiently yieldable to pass any protuberance which can not be scraped off.

The specific construction of the invention and the advantages thereof will be more fully explained in the following detailed description which is to be considered in connection with the accompanying drawing, illustrating the invention in its preferred form.

In the drawing:

Figure 1 is a longitudinal section through a portion of pipe in which the scraper is operating, the latter being shown in side elevation.

Figure 2 is a longitudinal section through one of the scraper elements, showing also the connection of the adjacent elements thereto.

Figure 3 is a transverse section taken on the line 3—3 of Figure 1.

Figure 4 is a transverse section taken on the line 4—4 of Figure 1.

The invention is shown in connection with a pipe 5, through which it is adapted to be hauled by a cable 6. The scraper comprises a plurality of scraping elements connected together in series. Each scraper element includes a comparatively stiff U-shaped spring member 7, which is reinforced centrally by an arcuate spring leaf 8, the concave side of which rests against a block 9. Next to the block 9 is a U-shaped spring member 10, similar to the spring member 7, but disposed transversely thereto. The spring member 10 is also reinforced by an arcuate spring leaf 11, which rests against a block 12. The parts 7 to 12 inclusive, are secured on a stem 13, which is polygonal in cross section with a collar 14 mounted on one end, and having its other end threaded to receive a nut 15 and washer 16, so as to clamp the parts in assembled relation thereon. The nut 15 is secured on the stem by a set screw 17.

Each stem 13 is formed at its front end with an eye 18, the eye of the first scraper element being connected directly to the cable 16, while the eye of each of the other scraper elements is connected to the stem of the scraper element ahead of it. For effecting this connecton, each nut 15 has a fork 19 extending rearwardly therefrom, and carrying a pin 20 on which a roller 21 is mounted. The roller is provided with a peripheral groove, and the eye 18, which receives the roller, is provided with a rounded surface, corresponding to the groove in the roller, but somewhat greater in diameter, so as to permit a free, universal movement between the respective scraper elements.

Each U-shaped spring member 7 has outwardly turned ends 22, and against the front faces of these outwardly turned ends bits 23 are seated. These bits have transverse slits 24 through which the spring members 7 and 10 pass, and the inner ends of the bits are formed with tangs 25, which are riveted or otherwise secured to the spring members. Certain of the bits are provided with teeth 26 for dislodging the deposits from the inner face of the pipe, and other bits, preferably those at the rear end of the string, are formed with blades 27, which scrape the deposits from the pipe and leave the surface thereof comparatively smooth. The ends of the bits are slightly arcuate to conform to the curvature of the pipe.

As many scraper elements as necessary may be connected in the string, and each element will be offset circumferentially from the preceding one, so that the string of scraper elements collectively will operate on the entire surface of the pipe.

The reinforcing leaves 8 and 11, together with the blocks 9 and 12, enable the scraper elements to exert the utmost pressure against the walls of the pipe, while at the same time the end portions of the spring elements 7 and 10 may yield sufficiently to pass any obstructions which can not be removed. The bits 26 and 27 are made from tool steel, and are so arranged that they may be removed for sharpening, or for repairs, or replaced when necessary. The joints between the several scraping elements permit the greatest flexibility, so that the scraper may easily pass around bends in the pipe, and may be pulled therethrough with the greatest facility.

While I have shown and described in detail the preferred form of the invention, it is to be understood that the shape and arrangement of the various parts may be considerably modified without any material departure from the salient features of the invention as set forth in the appended claims.

What is claimed is:

1. A pipe scraper including a plurality of elements connected together in series and each comprising a central stem polygonal in cross section, a U-shaped spring member centrally secured to the stem, an arcuate spring leaf secured within the concave central portion of the spring member and reinforcing the same, a block secured within the concave face of said spring leaf, and bits secured to the ends of said U-shaped spring member and projecting outwardly in diametrically opposite directions.

2. A pipe scraper comprising a series of stems connected end to end, and each having a head at one end formed with an eye, a nut threaded to the other end, and a scraper element secured between the head and the nut, the connection between adjoining stems comprising a fork extending longitudinally from the nut on one stem, a pin connecting the arms of the fork, and a grooved roller mounted on the pin and loosely held in the eye of the next stem, whereby to form a flexible universal connection.

3. A pipe scraper including a string of elements comprising central stems connected together end to end, U-shaped spring members centrally secured to the stems and having bits secured to their ends and projecting outwardly in diametrically opposite directions, certain of the bits in the front part of the string having serrated edges, and certain of the bits in the rear part of the string having smooth edges.

4. A pipe scraper element comprising a U-shaped spring member having outwardly turned ends, bits secured to said ends and projecting outwardly therefrom in diametrically opposite directions, an arcuate reinforcing spring leaf within the concave portion of the U-shaped member, and a block secured within the concave surface of the reinforcing leaf.

5. A pipe scraper element comprising a U-shaped spring member having rearwardly extending arms terminating in outwardly turned end portions, bits seated on the front faces of said outwardly turned portions and having slots through which the latter pass, the inner ends of said bits being formed with tangs secured to the inner faces of said arms.

6. A pipe scraper element, comprising a U-shaped spring member having rearwardly extending arms terminating in outwardly turned end portions, a reinforcing spring leaf secured within the concave portion of said spring member, a block secured within the concave surface of said leaf, a central stem on which the reinforcing spring member and block are secured, bits seated on the front faces of the outwardly turned portions of said spring member, and having slots through which said outwardly turned portions pass, the inner ends of said bits being formed with tangs secured to the inner faces of said rearwardly extending arms.

In testimony that I claim the foregoing as my own, I have hereto affixed my signature.

DANIEL J. McGEEHIN.